Nov. 12, 1929. L. ROUANET 1,735,507

BRAKE FOR MOTOR VEHICLE WHEELS

Filed Jan. 12, 1925

Inventor
L. Rouanet
by Marker Clerk Attys.

Patented Nov. 12, 1929

1,735,507

UNITED STATES PATENT OFFICE

LOUIS ROUANET, OF IVRY-PORT, FRANCE, ASSIGNOR TO COMPAGNIE D'APPLICATIONS MECANIQUES, OF IVRY-PORT, FRANCE, A FRENCH COMPANY

BRAKE FOR MOTOR-VEHICLE WHEELS

Application filed January 12, 1925, Serial No. 1,997, and in France January 23, 1924.

The present invention relates to brakes for motor vehicles in general, and more particularly to brakes for wheels mounted on driving or steering axles.

It is an object of the invention to provide an improved brake device arrangement characterized in that it includes a device for adjusting the positions of the brake shoes, in which the parts are so constructed and arranged that the reactions of the support for the adjusting member upon the bearing parts of the brake shoes are in the same direction as that of the strains on the said shoes during the operation of the brakes.

It is another object of the invention to provide an improved brake device arrangement as set forth in the preceding paragraph, comprising guides for the bearing parts of the brake shoes upon the adjusting member, so disposed and arranged that the said bearing parts are constantly applied against the said guides as well by the reactions of support of the adjusting member as by the strains supported by and transmitted through the shoes during the application of the brakes.

A further object of the invention is to provide a brake device arrangement in which the brake shoes are accurately guided laterally so as to insure a perfect operation of the parts or members of the device.

With these and other objects in view, the invention comprises a brake device arrangement, a preferred construction of which is illustrated in the accompanying drawing, in which:—

The same references designate the same parts in all the figures of the drawing.

Figure 1:
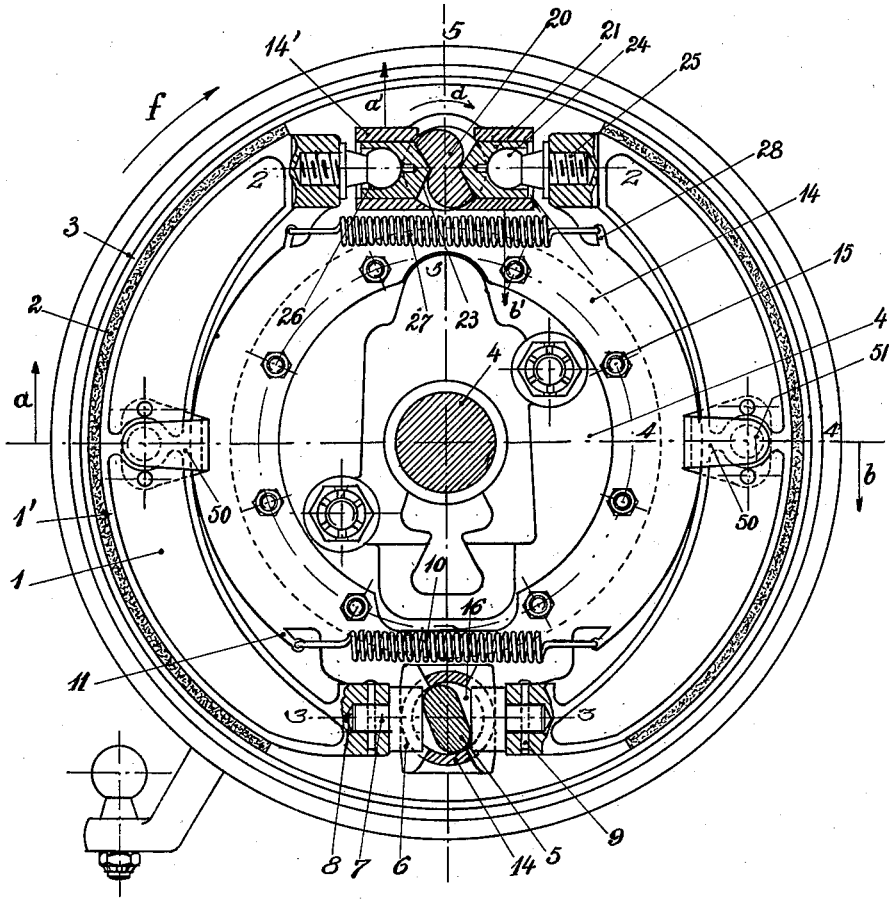
Fig. 1 is a front elevation, partly in section, of an improved brake device according to the invention.
Figure 2:
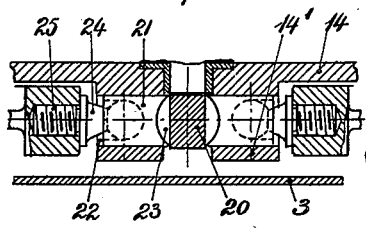
Fig. 2 is a horizontal section, taken on line 2—2 of Fig. 1, and passing through the regulating part of the device.

The brake shoes 1, by means of which the brake effect is obtained, are preferably of light metal and provided, as usual, with brake linings 2 of any suitable material. The crown of the brake drum 3, upon which act the brake shoes 1, is formed integral with a wheel (not represented) rotating on the swivel 4 of a vehicle axle (also not represented).

The mechanism for operating the brake shoes 1, comprises a cam 5, of hard metal, and acting on blocks 6 provided with smoothed or threaded studs 7 fitted in housings 8 provided at one of the ends of each shoe 1, the fastening of the blocks 6 being insured by means of keys 9 passing through the studs 7.

The brake shoes 1 are retained against the cam 5 by means of a tension spring 10 hooked at 11 on the said brake shoes 1.

Figure 3:
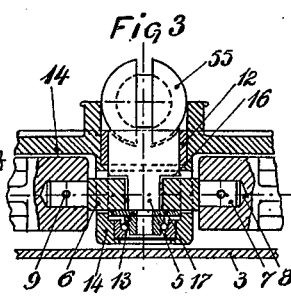
Fig. 3 is a horizontal section, taken on line 3—3 of Fig. 1, and passing through the brake shoes operating part of the device.

The actuating cam 5 is pivoted in smooth journals 12 and in a ball bearing stop 13 (Fig. 3) mounted in the crown 14, said crown being preferably formed from light metal and fastened on the swivel 4 by means of bolts 15.

In the particular case of a brake for steering wheels, as illustrated in Fig. 1 of the annexed drawing, the operating cam 5 is actuated through the intermediary of a universal joint 55.

The blocks (see Fig. 3) are laterally guided between a shoulder 16 on the operating cam 5 and a washer 17 inserted between the ball bearing stop 13 and the operating cam.

The parts of the brake which are most subjected to wear are of simple construction, yet designed to withstand usage. The frictional engagement will only take place between parts formed of hard metal, as the blocks 6, the operating cam 5, the washer 17, the ball bearing stop 13 and the journal 12. All the other members are formed from light metal and not subject to wear.

The mechanism for adjusting the brake comprises a cam 20 of hard metal and acting on two cylindrical plungers 21, disposed on each side of the said cam and sliding in housings 22 formed in projections 14$^1$ of the brake plate 14.

The ends of the plungers 21 are chamfered at 23 with an outline corresponding to that of the cam 20. Sockets 26 are provided in the plungers 21 to receive the knuckles 24, provided with smooth or threaded studs 25 fixed in corresponding holes formed in that end of each brake shoe 1 diametrically opposite the operating cam 5.

A spring 27, fastened in suitable hooks 28 of the brake shoes 1, maintains the latter in close contact with the adjusting cam 20 through the intermediary of the knuckles 24 and plungers 21, for every position of the said cam.

When applying the brakes, the drum 3 being rotated in the direction of the arrow $f$, the plunger 21 situated at the left of Fig. 1 is pressed upward in the direction of the arrow $a$, whilst the plunger 21 situated at the right side of the same figure, is pressed downwards in the direction of the arrow $b$; said two plungers being applied against a portion of their cylindrical housing, the wear or slack having no effect on the operation of the brake.

The outline of the cam 20 and the direction of its rotating movement (arrow $d$) are such that the action of the spring 27 results, for each of the plungers 21, in an effect of the same kind as that resulting from the tightening of the brakes and reinforces this latter (see arrows $a'$ and $b'$) to apply more strongly each of the plungers 21 against the above mentioned portion of their respective housings.

It results from this special arrangement that any displacement of the linked points is prevented even when the cam, the plungers, and the knuckles are slackened to a considerable extent.

The assembling is excessively simply realized, and the work of adjustment is reduced to a minimum, the plungers being simply cylindrical fingers sliding in housings of corresponding shape, which necessitates no accuracy.

By reason of the special shape of one of their ends, the plungers 21 will adjust themselves in the proper position about their axis, relative to the cam 20. The brake shoes 1 being retained by the knuckles 24, the correct bearing on the plungers 21 is insured without special adjustment, notwithstanding a somewhat rough coaction of the various members.

It is to be noted that, in operation, the brake shoes 1, made of light metal, are held from frictional contact with the operating members, the single frictional contact taking place between the knuckles 24 and the plungers 21, both formed of hard metal.

Figures 5, 6, 7:
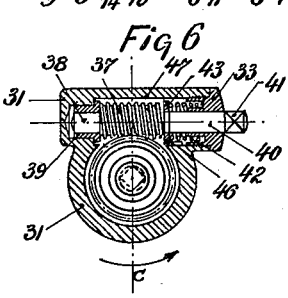
Fig. 5 is a vertical section, taken on line 5—5 of Fig. 1, and passing through the regulating part of the device.
Fig. 6 is a section, taken on line 6—6 of Fig. 5.
Fig. 7 shows, respectively in plan view and elevation, a member of the regulating part of the device.

The invention also relates to the special assembling of the adjusting cam 20 (Figs. 5 and 6), so formed and disposed as to be able to rotate in a smooth journal 30 supported on the crown 14 in which is formed, at a convenient location, a casing 31 closed by means of a cover 32 (Fig. 5) and plug 33 (Fig. 6).

The axle of the cam 20 extending in the casing 31 is provided with a square or polygonal portion at 34 upon which is mounted a worm wheel 35 maintained in position by means of a nut 36.

The construction of the casing 31 is simple, consisting in two cylindrical borings (48 and 30$^1$) and one screw threading (49) operation.

The mounting of the cam 20 is a simple operation, it being sufficient, the cover 32 being removed, to introduce the said cam from the inside of the brake drum, the worm wheel 35 being introduced from the exterior and then fixed in position on the cam by means of the nut 36.

The worm wheel 35, mounted on the adjusting cam 20 is actuated from the exterior by means of a worm 37, mounted in such manner as to rotate with its end 38 in a smooth journal 39 supported by the casing 31.

The worm 37 has its other end formed with a cylindrical portion 40 guided in the plug 33 within which it rotates. The portion 40 extends externally from the stopper 33 and is provided with any suitable means to rotate the worm 37 from the exterior. In the illustrated example, this means comprises a square portion, but it will be evident that the said means may be either a simple slot or any other equivalent device.

The worm 37 is preferably irreversible, but, to improve the security, a spring 42 is disposed between a washer 43 and the plug 33. The washer is axially guided in the casing 31 by means of a feather 45 (Fig. 7) engaged in a groove 46, and this washer 43 is provided with serrations 44 in engagement with corresponding serrations formed on the endless screw 37.

By exerting a suitable force on the square end 41, the worm is caused to rotate, the washer 43 sliding backwards on the portion 40 when the serrations of the washer overcome the corresponding serrations of the endless screw 37. On the contrary the self rotating movement of the worm is prevented owing to the tensional resistance of the spring 42 forcing the serrated washer 43 against the serrated part of the said screw.

Further, the cam 20 is so disposed that the strain due to the brake shoes 1, during the tightening of the brakes, will carry them in rotation in the direction of the arrow c (Fig. 6), in order that the reaction should be supported by the journal 39, independently of the spring 42.

The assembling of the endless screw 37 is as simple as that of the cam 20, it being sufficient to introduce them in the cylindrical hole 47 easily formed in the casing 31, and then, after having placed the washer 43 and spring 42, to screw up the stopper 33, said stopper, owing to the action of the spring 42, being automatically locked in its tightened position.

The operation of this part of the device is simple, it being sufficient to act from the exterior on the square portion 41 to adjust immediately and accurately the working of the brake without modification in the working of the driving members.

Figure 4:
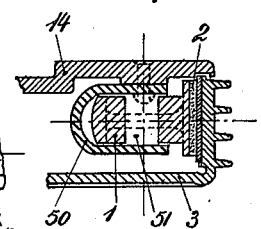
Fig. 4 is a horizontal section, taken on line 4—4 of Fig. 1, and passing through the lateral guide arrangement of one of the brake shoes.

In this improved brake system, the brake shoes 1 are maintained, on the one hand by the knuckles 24 supported and guided by the plungers 21, and, on the other hand, by the blocks 6 bearing against and supported on the operating cam 5. The guide so obtained is completed by bridge pieces 50 (Figs. 1 and 4), formed from resilient steel, and fixed on the light metal crown 14.

The bridge pieces 50, the shape of which is favourable to their resiliency, insure a convenient lateral guide for the brake shoes 1 by means of the cylindrical fingers 51 formed of hard metal and fixed on the said brake shoes 1.

The parts of the brake made from light metal are never subjected to frictional contact.

None of the bearings 24, 51 and 6 insures alone a lateral guide. The bearing surfaces being spherical, they may be constructed without precision and the faults of construction will not have any detrimental effect upon the position of the crown 14 which is held in place by the combined action of the bearings 24, 51 and 6 without any possibility of play, slack or jamming.

The only parts of this device protruding externally are the end of the operating cam, and the part 41 by means of which the adjustment may be made.

Claims:

1. A brake arrangement for the wheels of motor and like vehicles, comprising a brake drum, brake shoes mounted inside the drum, an operating cam and an adjusting member for said brake shoes, cam shaped surfaces on the adjusting member, bearing members mounted at the ends of the brake shoes adjacent to the adjusting member, plungers with recesses formed therein to receive said bearing members, guides for said plungers and means for constantly applying said plungers against the cam shaped surfaces of the adjusting member.

2. A brake arrangement for the wheels of motor and like vehicles, comprising a brake drum, brake shoes mounted inside the drum, an operating cam acting at one end of the brake shoes, knuckles mounted at the other ends of said brake shoes, a support, guides mounted on said support and plungers slidable in the said guides, spherical recesses formed in the plungers at one end thereof and receiving the knuckles, cam shaped surfaces at the other ends of the plungers, an adjusting member, cam shaped surfaces formed thereon and a tension spring symmetrically hooked on the two brake shoes relative to the axial plane of the axis of the adjusting member for constantly applying the said cam shaped surfaces of the plungers on the cam shaped surfaces of the adjusting member.

3. In a brake arrangement as claimed in claim 1 the cam shaped surfaces correspondingly disposed on either side of the adjusting member and flat abutting faces adjacent said cam shaped surfaces, whereby operative action of the adjusting member is obtained in a predetermined direction of rotative movement.

4. In a brake arrangement as claimed in claim 1, the operating cam for the brake shoes operated through a universal joint the intermediate member of which is partly located in and abuts against a housing formed in the body of the brake plate.

5. In a brake arrangement as claimed in claim 1, wherein a worm wheel is mounted integral with the adjusting member for the brake shoes, a housing, an actuating screw for the worm wheel located in said housing, and a spring disposed in said housing to push the screw in the same direction as that in which said screw is forced by the resulting action of the brake shoes when the latter are applied.

6. In a brake arrangement as claimed in claim 1, a support, and housing formed in the support, a cylindrical body journaled therein, a restricted portion in said body, the restricted portion having cam shaped bearing surfaces for the ends of the brake shoes, a lateral shoulder for said shoes formed between the cylindrical body and the restricted portion, an outward extension on said restricted portion, a washer mounted thereon and providing for a second lateral shoulder for the ends of the brake shoes, and an end thrust bearing receiving the said extension and located in the end of the said housing.

7. In a brake arrangement as claimed in claim 1, a support, the operating cam and the adjusting member being journaled in said support, the brake shoes being disposed between said operating cam and adjusting member, means on the operating cam and on the support adjacent the adjusting member to prevent lateral displacement of the ends of said shoes, spindles extending through the brake shoes and contacting with forked pieces at either side of the said shoes, to complete the lateral guiding of the latter.

In testimony whereof I affix my signature.

LOUIS ROUANET.